United States Patent
Harris et al.

(10) Patent No.: US 7,262,522 B2
(45) Date of Patent: Aug. 28, 2007

(54) MICROELECTROMECHANICAL ISOLATING POWER CONVERTER

(75) Inventors: Richard D. Harris, Mentor, OH (US); Patrick C. Herbert, Mentor, OH (US); Michael J. Knieser, Fortville, IN (US); Robert J. Kretschmann, Bay Village, OH (US); Mark A. Lucak, Hudson, OH (US); Robert J. Pond, Doylestown, OH (US); Louis F. Szabo, Broadview Heights, OH (US); Frederick M. Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 510 days.

(21) Appl. No.: 10/675,537

(22) Filed: Sep. 30, 2003

(65) Prior Publication Data

US 2005/0067901 A1    Mar. 31, 2005

(51) Int. Cl.
*H04B 3/04* (2006.01)
*B81B 7/04* (2006.01)
*B81B 3/00* (2006.01)

(52) U.S. Cl. .................................................. 307/125
(58) Field of Classification Search ................ 307/125; 310/311; 290/1 R
See application file for complete search history.

(56) References Cited

U.S. PATENT DOCUMENTS

| | | | |
|---|---|---|---|
| 6,188,322 B1 * | 2/2001 | Yao et al. ..................... | 340/664 |
| 6,317,342 B1 * | 11/2001 | Noworolski et al. .......... | 363/59 |
| 6,348,788 B1 * | 2/2002 | Yao et al. .................. | 324/99 R |
| 6,411,214 B1 * | 6/2002 | Yao et al. ..................... | 340/664 |
| 6,417,743 B1 * | 7/2002 | Mihailovich et al. ..... | 333/24 C |
| 6,466,005 B1 * | 10/2002 | Yao et al. ................ | 324/117 R |
| 6,497,141 B1 * | 12/2002 | Turner et al. .................. | 73/105 |
| 6,504,356 B2 * | 1/2003 | Yao et al. .................. | 324/99 R |
| 6,987,435 B2 * | 1/2006 | Ko et al. ....................... | 335/78 |
| 2001/0050618 A1 * | 12/2001 | Dummermuth et al. ..... | 340/664 |
| 2002/0070723 A1 * | 6/2002 | Herbert et al. ............ | 324/99 R |
| 2003/0020472 A1 * | 1/2003 | Kretschmann et al. ...... | 324/259 |
| 2004/0007942 A1 * | 1/2004 | Nishida et al. ............. | 310/314 |

* cited by examiner

*Primary Examiner*—Brian Sircus
*Assistant Examiner*—Adi Amrany
(74) *Attorney, Agent, or Firm*—Keith M. Baxter; Alexander R. Kuszewski (57) ABSTRACT

A microelectromechanical system (MEMS) device is used to transfer power from a source generator to a power generator that delivers electrical power to a load, while maintaining electrical isolation between the source generator and power generator for size critical applications where transformers or coupling capacitors would not be practical, but where electrical isolation is desired.

13 Claims, 6 Drawing Sheets

MICROELECTROMECHANICAL ISOLATING POWER CONVERTER

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to microelectromechanical systems (MEMS) and in particular to MEMS for transferring electrical power from a source to an output while maintaining electrical isolation between the points of transfer.

MEMS are extremely small machines fabricated using integrated circuit techniques or the like. The small size of MEMS makes possible the mass production of high speed, low power, and high reliability mechanisms that could not be realized on a larger scale.

Often in electrical circuits, it is desirable to transfer power between two points while maintaining electrical isolation between those points. Isolation, in this context, means that there is no direct current (dc) path between the points of transfer. Isolation may also imply a degree of power limiting that prevents faults on one side of the isolation from affecting circuitry on the other side of the isolation.

Conventional techniques of power transfer with electrical isolation include the use of transformers or capacitors such as may provide alternating current (ac) power transfer while eliminating a direct dc path. Additional circuitry used to implement these conventional techniques can add considerable expense. Furthermore, the large size of the capacitor or transformer may preclude its use in certain applications where many independently isolated circuits must be placed in close proximity, or where isolation is required on a very small mechanical scale, for example, on an integrated circuit.

It is therefore desirable to provide an integrated circuit-level power converter that is less expensive and smaller than that achieved using conventional techniques.

BRIEF SUMMARY OF THE INVENTION

In accordance with one aspect of the invention, an electrically isolated power transfer MEMS device is provided for delivering electric power to a load. The MEMS device includes a source generator including a movable member. The source generator converts an electrical input signal to a displacement of the movable member. An insulated power transfer structure defines an input end in communication with the movable member that receives the displacement. The power transfer structure further defines an output end opposite the input end that communicates the displacement. An electrical generator is disposed at a second end of the device and receives the displacement from the output end of the power transfer structure. The electrical generator, in response to the displacement, generates electrical power that is delivered to the load.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention.

BRIEF DESCRIPTION OF THE DRAWINGS

The invention is described in more detail below on the basis of the accompanying drawings, in which.

DETAILED DESCRIPTION OF THE PREFERRED EMBODIMENT

Figure 1:
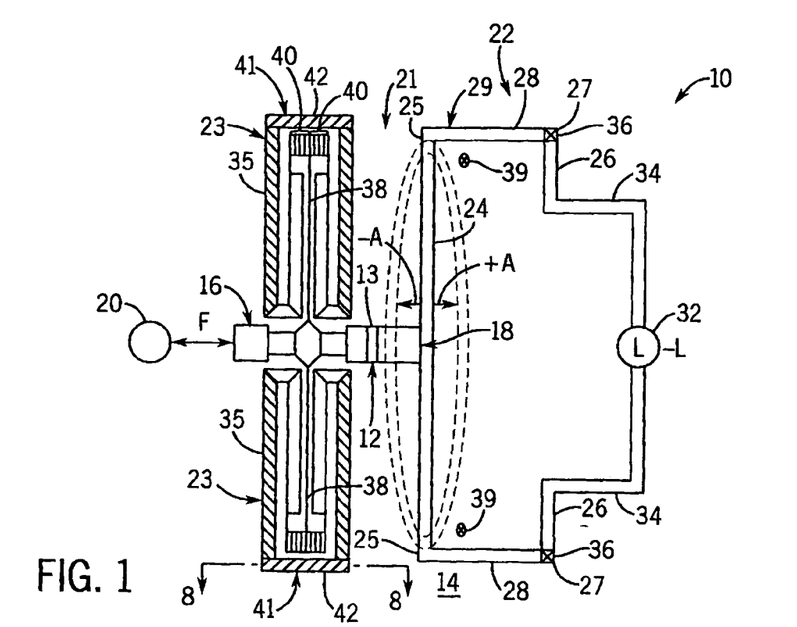
FIG. 1 is a simplified top plan view of a MEMS-based power converter constructed in accordance with a preferred embodiment of the invention.

Referring initially to FIG. 1, a MEMS device 10 is supported by an underlying substrate 14. Device 10 includes an insulated power transfer structure 21 that is interposed between a source generator 20 and an electrical generator 22. Generator 20 can either receive or generate an electrical input signal and convert the signal to a force F that produces a mechanical displacement. Alternatively, generator 20 can produce the displacement from a mechanical or thermal source. Generator 20 can thus be interpreted broadly as an electrical power-to-force-to-displacement generator, whose force can either be received or generated locally from an input electrical signal.

Substrate 14 may be conductive or insulating, and may comprise glass, high resistivity silicon, crystalline sapphire, crystalline silicon, polycrystalline silicon, silicon carbide, or ceramic such as alumina, aluminum nitride, and the like, or gallium arsenide. Substrate 14 may alternatively comprise any suitable material capable of supporting MEMS device 10. The MEMS device 10 is described herein as having components that enable the device 10 to be electrically isolated from substrate 14, it being appreciated that isolation between the device 10 and the substrate 14 would not be necessary when the substrate 14 comprises an insulating material.

Power transfer structure 21 includes a movable elongated beam 12 that extends along a longitudinal axis L-L and is suspended above the substrate 14. Beam 12 defines a leftmost longitudinal end 16 that defines an input end of the power transfer structure 21 that interfaces with source generator 20 such that displacement output by generator 20 is imparted onto input end 16. Beam 12 further defines a rightmost longitudinal end 18 that defines the output end of the power transfer structure 21 and interfaces with electrical generator 22. Displacement of beam 12 is thus imparted onto generator 22 which, in turn, generates power that is subsequently delivered to a load 32 as will be described in more detail below. As defined herein, end 16 is disposed "longitudinally inwardly" of end 18.

Beam 12 includes at least a section 13 disposed between generators 20 and 22 that is formed from an electrically insulating material, such as $SiO_2$ in accordance with the preferred embodiment to provide electrical isolation between generators 20 and 22. It should be appreciated, however, that beam 12 could, as a whole, comprise any suitable insulating material, such as $Si_3N_4$. Beam 12 could alternatively comprise any suitable material so long as the beam includes an insulating portion that is disposed between generators 20 and 22 to prevent electrical communication therebetween. It should further be appreciated that if the substrate 14 comprises an insulating material, the electrical isolation between generators 20 and 22 would be enhanced.

The beam 12 is connected proximal its left longitudinal end 16 to a pair of support structures 23 that are, in turn, attached to the substrate 14. Each support structure 23 includes an outer frame 35 that is connected to a transverse arm 38 via wrist structures 40 that are disposed at the outer end of each transverse arm 38. Arms 38 are aligned longitudinally, and extend transversely outwardly from beam 12 to the corresponding wrist structure 40. Wrist structures 40 are compliant so as to support motion of arms 38, and the beam 12, in the direction of longitudinal axis L-L.

Arms 38 and wrist structures 40 are all suspended above the substrate 14 and are preferably coplanar with beam 12. Outer frames 35, including outer ends 41, are connected to insulating pylons 42 that extend upwardly from the substrate 14. Pylons 42, and all pylons disclosed herein, may either be members separate from the substrate 14, or could be integral with the substrate.

Figures 6, 7, 8:
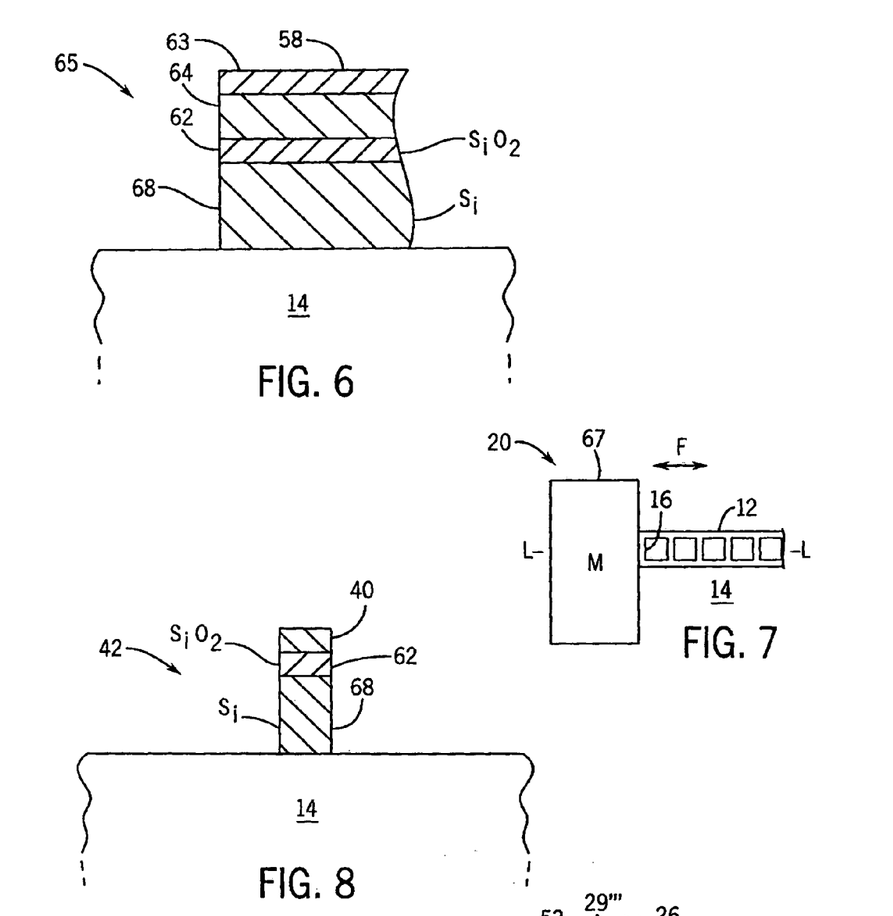
FIG. 6 is a sectional side elevation view taken along line 6-6 of FIG. 5.
FIG. 7 is a top plan view of the force/displacement generator of the MEMS device illustrated in FIG. 1 constructed in accordance with an alternate embodiment of the invention.
FIG. 8 is a sectional side elevation view taken along line 8-8 of FIG. 1.

For instance, referring now to FIG. 8, pylons 42 (and preferably all pylons) are constructed to provide electrical isolation between substrate 14 and MEMS device 10. Pylon 42 includes a layer 68 of wafer material, such as silicon, that extends outwardly from substrate 14 and is connected at its outer end to a layer 62 of insulating material, such as $SiO_2$ or $Si_3N_4$. The insulating layer 62 ensures that any electricity originating at, or input to, source 20 does not conduct into the MEMS device 10. Alternatively, substrate 14 can be insulating, in which case pylons 42 would not need to provide electrical isolation but would only need to support MEMS device 10 above the substrate 14. Wrist structure 40 is connected to the outer surface of layer 62 or, if an insulating layer is not needed, to the outer surface of layer 68.

Because support structures 23 are electrically isolated from the substrate via pylons 42, and because beam 12 is an insulator, as described above, the arms 38, frames 35, and wrist structures 40 may be insulating or conductive and preferably comprise Si in accordance with the preferred embodiment due to ease of fabrication. It should be appreciated that any suitable material, such as SiC, may be used as appreciated by one having ordinary skill in the art.

While support structures 23 enable longitudinal beam movement in accordance with the preferred embodiment, it should be appreciated that any structure supporting beam 12, and enabling the beam to translate along the axis L-L can be implemented in accordance with the present invention.

Generator 22 includes a deflectable transverse arm 24 connected at its midsection to the rightmost longitudinal outer end 18 of beam 12. Arm 24 comprises a flexible conductive material so as to bow outwardly and inwardly during operation, as indicated by arrows +A and −A, respectively, in response to longitudinal translation of beam 12. Arm 24 defines transverse outer ends 25 that are connected to longitudinal electrically conducting sections 28 that extend longitudinally outwardly (away from beam 12) and terminate at the transverse outer ends 27 of a transverse electrically conducting stationary trace 26 that extends generally parallel to arm 24.

Traces 26 are connected to substrate 14 at their transverse outer ends 27 via insulating pylons 36 that extend upwardly from the substrate 14. Pylons 36 are constructed in a manner similar to that illustrated and described above with reference to FIG. 8, and provide structural support for the generator 22 and beam 12. Electrical sections 28 are preferably sufficiently rigid to prevent twisting about pylons 36 to ensure that the movement of beam 12 results in the deflection of transverse arm 24 rather than deformation of trace 26, which would prevent a change in loop area. It should be appreciated that arm 24 may further be connected to substrate 14 via pylons at its outer ends 25 if additional structural support is desired. Traces 26 are further connected via longitudinal electrically conducting traces 34 to a load 32 that may be located remotely from MEMS device 10.

An electrical loop 29 is thus formed including arm 24, sections 28, traces 26 and 34, and load 32. The area of the loop 29 thus varies in response to movement of arm 24. It should thus be appreciated that an electrical circuit is also thereby formed by arm 24, sections 28, and traces 26 and 34 to deliver power to load 32 upon generation of an electrical current. Loop 29 is disposed in a magnetic field 39 such that, as the area of the loop varies, electrical current is generated and delivered to load 32.

Components of the electrical circuit, and other electrically conductive elements of MEMS device 10, may be formed of any suitably conductive material, such as aluminum, gold, nickel, and copper. Aluminum is used in accordance with the preferred embodiment because of ease of deposition during fabrication.

During operation, source generator 20 provides an output displacement that is imparted onto beam 12. The beam receives the displacement at its leftmost end 16, which provides an input for the power transfer structure 21, and translates along the longitudinal axis L-L in response to the input displacement. As beam 12 is translated along the longitudinal axis L-L, the rightmost end 18 of beam 12 imparts the displacement onto arm 24. Arm 24 thus provides an input for the electrical generator 22, and is deflected in the +A direction when the displacement is positive, and in the −A direction when displacement is negative, it being appreciated that force F can cause displacement in either longitudinal direction; i.e., either a push or a pull. Force F can both push beam 12 for +A deflection and pull beam 12 for −A deflection, or it can apply one or the other and allow the spring action of section 24 to return the beam to the rest position. As arm 24 is deflected, the area of loop 29 is altered in the presence of magnetic field 39.

As a result of the change of loop area, the magnetic flux (from the nearby magnet) enclosed within the loop changes which induces an EMF within the loop. The value of the EMF induced by the generator 22 is given in accordance with the following well-known equation:

$$EMF = d\Phi/dt \qquad (1)$$

where EMF is induced by the generator 22 and Φ is the magnetic flux enclosed within loop 29. Φ, in turn, equals B*A (where B is the magnetic field, and A is the area of the loop 29). Electrical power is thereby induced in the loop 29, and is output along electrical traces 34 to be delivered to load 32.

It is preferable that source generator 20 produces a displacement that varies so as to continuously move the beam 12 back and forth in the longitudinal direction with both positive and negative displacements to continuously generate power at generator 22, whereas a single direction displacement would only bias the beam 12 towards a predetermined direction as an isolated occurrence, thereby deflecting transverse arm 24 only once. The present invention further contemplates that it is typically desirable to transfer power from source generator 20 to produce an isolated ac output at electrical generator 22. However, generator 22 could alternatively produce a dc output from an ac input using a standard filter and rectifier as is known by one having ordinary skill in the art.

While generator 22 relies on beam displacement to cause a change of area of loop 29 in the presence of magnetic field 39 to induce electrical power, it should be appreciated that arm 24 of generator 22 could alternatively comprise a piezoelectric material. The piezoelectric material would receive the displacement output by source generator 20 via beam 12 and, in response to deformation of the piezoelectric material, generate a voltage that is delivered to load 32. This embodiment would eliminate the need for magnetic field 39. It should thus be appreciated in both embodiments that the output of source generator 20 causes beam 12 to translate, which, depending on the type of generator 22, displaces arm 24, thereby causing generator 22 to produce electrical power.

Figure 10:
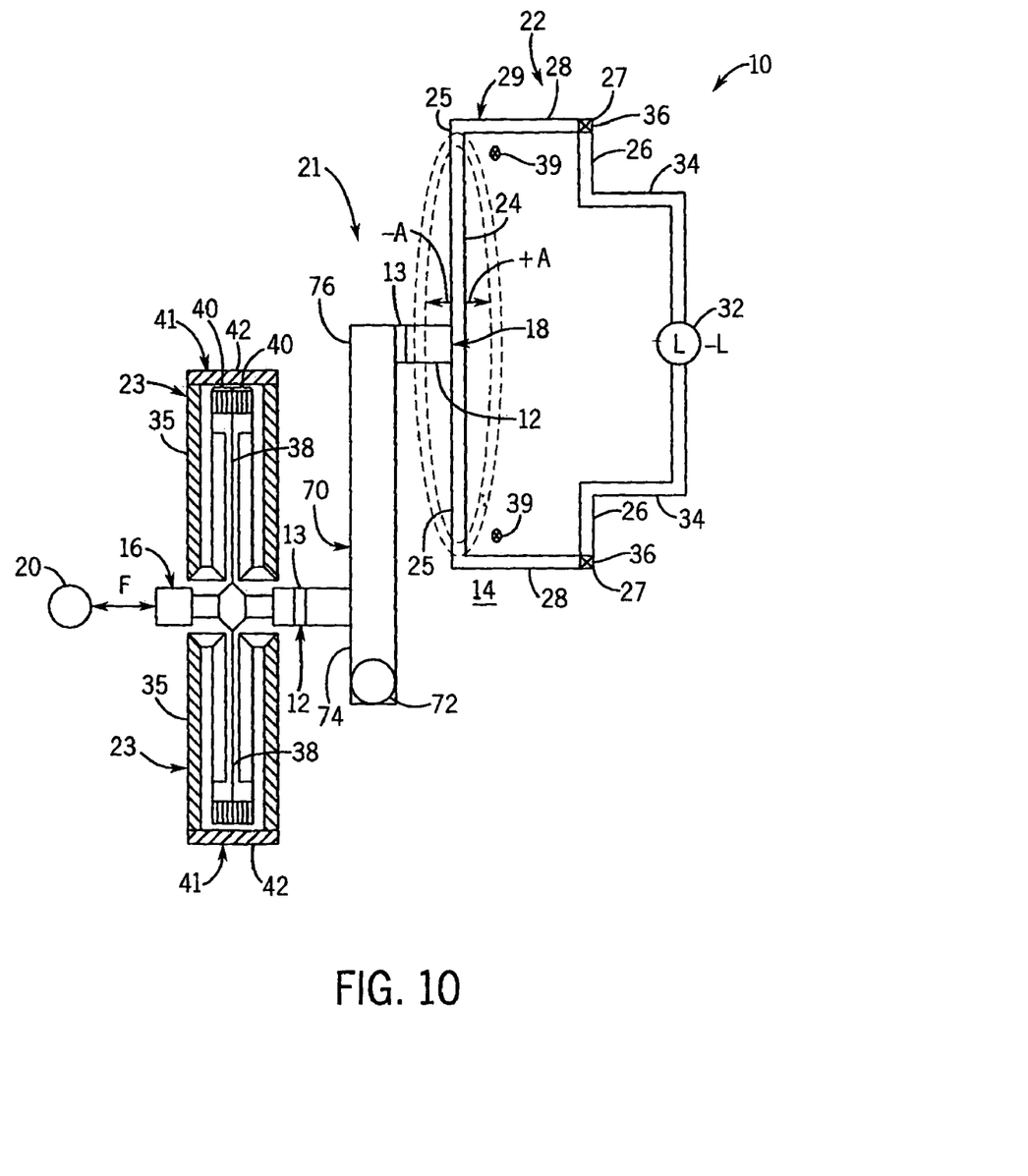
FIG. 10 is a simplified top plan view of a MEMS-based power converter similar to that illustrated in FIG. 1, but with a power transfer structure constructed in accordance with an alternate embodiment of the invention.

Referring now to FIG. 10, transfer structure 21 is illustrated in accordance with an alternate embodiment. In particular, structure 21 includes a lever 70 that extends substantially transversely, and is hinged connected to substrate 14 at joint 72. Lever 70 defines a first end 74 proximal joint 72 and a second end 76 opposite the first end 74. It should be appreciated that lever can be pivoted about joint 72 which will cause second end 76 to deflect longitudinally a significant distance greater than first end 74. A first beam 12 extends longitudinally from source, as described above, and is connected at its outermost end to first end 74 of joint 72. A second beam 12 extending longitudinally inwardly from generator 22 is connected to the second end of lever 70. Both beams 12 preferably include an insulating member 13 to provide electrical isolation, as described above. During operation, deflection of first beam 12 acts against the first end 74 of the lever 70 and causes the lever to pivot about joint 72. The deflection of first beam 12 is thus magnified at the second end 76, which causes translation of second beam 12. The increased beam translation causes greater deflection of movable arm 24. Accordingly, transfer structure 21 illustrated in FIG. 10 amplifies the source input and causes a higher power output from generator 22.

Figure 11:
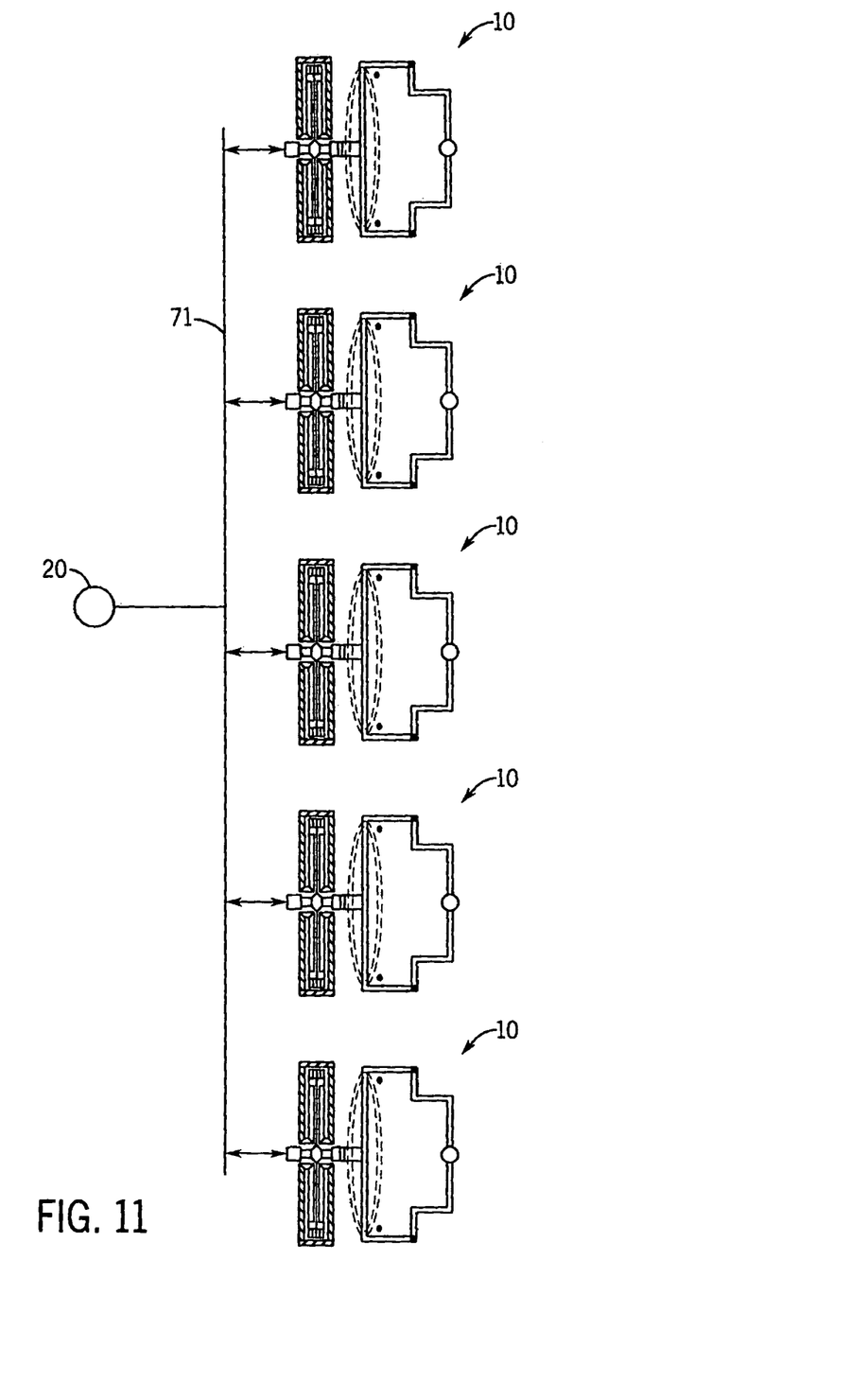
FIG. 11 is a simplified top plan view of an array of MEMS-based power converters connected to a single source in accordance with an alternate embodiment.

Referring now to FIG. 11, it should be appreciated that an array of power converters 10 can be connected to a single source 20. Source 20 can include a transverse beam 71 that is connected to the source output at one end, and connected to the left end 16 of beams 12 of a plurality of MEMS devices 10 at another end. Accordingly, source 20 can cause each beam 12 of a plurality of MEMS power converters 10 to deflect and induce power in the corresponding generators 22.

Figure 2:
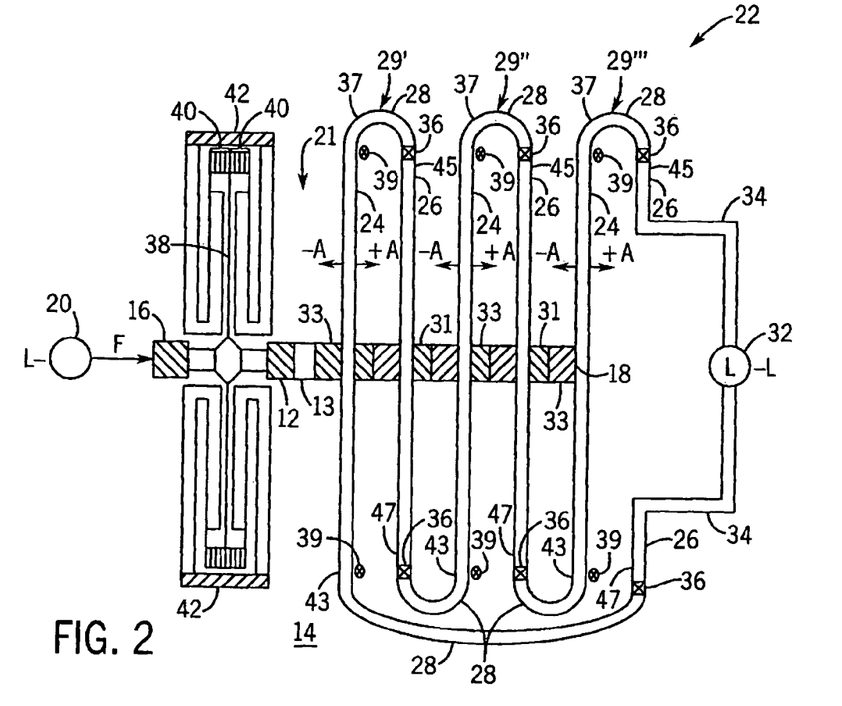
FIG. 2 is a simplified top plan view of a MEMS-based power converter having constructed in accordance with an alternate embodiment of the invention.

While the induced EMF depends on, to some extent, the strength of force F output from source generator 20 driving the displacement, it may nonetheless be desirable to control the EMF by providing electrical generator 22 with multiple movable loop portions 29', 29", and 29'" as illustrated in FIG. 2. This geometry serves to increase the amount of area change for a given displacement of beam 12. While three such loop portions are illustrated, it should be appreciated that a greater or lesser number of loop portions may be implemented in generator 22 depending on the desired power output. Loop portions 29', 29", and 29'" are defined herein as having a movable arm 24 and stationary trace 26, respectively, that are electrically connected in series to an adjacent loop portion via sections 28, it being appreciated that the last loop portion 29'" in the series and the first loop portion 29' in the series are considered to be adjacent to each other for the purposes of this description. For the purposes of clarity and convenience, loop portions 29', 29", and 29'" are identified collectively as a loop portion 29 throughout this disclosure.

In order to accommodate loop portions 29 in the generator 22 of MEMS device 10, the insulating beam 12 is further elongated and extends partially into generator 22. A plurality of recesses 31 are formed in the upper surface of beam 12 so as to define a corresponding plurality of mounting platforms 33 disposed adjacent recesses 31. Each recess 31 is thus correspondingly interposed between adjacent platforms 33. The generator 22 includes a plurality of movable transverse arms 24 having a first transverse outer end 37 and a second transverse outer end 43. Generator 22 further includes a plurality of stationary traces 26 having a first transverse outer end 45 and a second transverse outer end 47. The first transverse outer ends 37 and 45 of the movable arm 24 and stationary trace 26, respectively, as well as the second transverse outer ends 43 and 47 of the movable arms 24 and stationary traces 26, respectively, are substantially transversely aligned with each other.

Each loop portion 29 includes a movable transverse arm 24 whose midsection is mounted onto beam 12 at a unique platform 33 along with a stationary electrical trace 26 that is mounted onto substrate 14 at its transverse outer ends 45 and 47 via insulating pylons 36. Stationary traces 26 are positioned so as to extend transversely over recess 31. First transverse outer ends 37 and 45 of adjacent movable arms 24 and stationary traces 26, respectively, in a given loop are electrically connected to each other via electrical sections 28. In particular, adjacent loop portions 29 are electrically connected via electrical sections 28 that extend from the second transverse outer end 47 of stationary trace 26 to the second transverse outer end 43 of movable arm 24.

Transverse outer end 45 of stationary trace 26 of longitudinally outermost loop portion 29'" is connected to load 32 via trace 34. The load 32 is further connected via trace 34 to transverse outer end 47 of trace 26 of loop portion 29'".

Transverse outer end 37 is, in turn, connected to transverse outer end 43 of movable arm 24 of the longitudinally innermost loop portion 29' to complete the electrical circuit and connect all loop portions 29''' and 29' in series with the load 32. A magnetic field 39 is disposed adjacent each movable beam 24 of each loop to generate power upon deflection of the beam 24, as described above.

During operation, source generator 20 imparts a displacement onto the leftmost end 16 of beam 12. Beam 12 is translated along the longitudinal axis L-L, which correspondingly deflects movable transverse arms 24 of loop portions 29 in the directions of +A and −A, depending on the direction of force F. Recesses 31 prevent stationary traces 26 from interfering with the beam 12 as it translates. Alternatively, traces 26 could be suspended higher above substrate 14 than arm 24, thereby avoiding any potential interference between traces 26 and beam 12 without the need to form recesses 31. However it is preferable that arms 24 and traces 26 be coplanar for ease of fabrication.

As arms 24 are deflected in the longitudinal direction, the area of corresponding loop portions 29 also changes in the presence of magnetic field 39, thereby inducing electrical power that is delivered to load 32 as a function of the aggregate change in area of the loop portions 29. Because loop portions 29 are connected in series, generator 22 produces an increased area change and thus an increased EMF as compared to the single movable arm embodiment illustrated in FIG. 1. It should further be appreciated that the insulating portion of power transfer structure 21 enables the source generator 20 to be electrically isolated from the electrical generator 22. It should be appreciated that there are geometric arrangements other than the one illustrated in FIG. 2 where there are multiple portions of the loop that move and so enhance the total area change and therfore the induced EMF.

It should be appreciated that arms 24 can alternatively comprise a piezoelectric material that deforms to generate a voltage as described above. If arms 24 are piezoelectric, they would not be connected to stationary transverse traces 26, but rather connected to beam 12 and to substrate 14 at pylons 36, such that beam displacement would cause a deformation of arms 24. It should thus be appreciated that no need would exist to form recesses 31 in beam 12 in accordance with this embodiment. Arms 24 would be connected in series to generate an increased voltage (compared to the embodiment illustrated in FIG. 1) that is applied to load 32.

Figure 3:
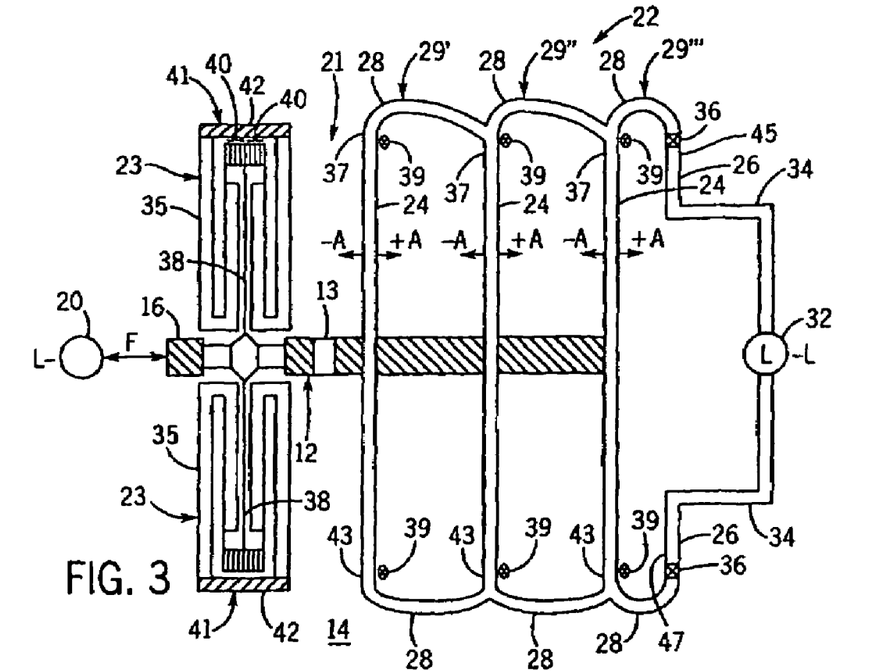
FIG. 3 is a simplified top plan view of a MEMS-based power converter constructed in accordance with another alternate embodiment of the invention.

Alternatively, referring now to FIG. 3, it should be appreciated that the current level output to load 32 could be increased by connecting a plurality of loops 29 in parallel. In particular, the structure of beam 12 extends into generator 22 as described above, but does not include either the stationary arms 26 or the recesses 31 illustrated in FIG. 2. Electrically conductive arms 24 extend laterally across beam 12, and are connected to beam 12 at their midsection. Adjacent lateral outer ends 37 are connected to each other via electrical traces 28, and laterally outer ends 43 are also connected to each other via electrical sections 28. Longitudinally outer arm ends 37 and 43 are connected to load 32 via traces 26 and 34. Accordingly, adjacent loops 29 are connected in parallel with load 32 to increase the current level output to the load.

During operation, beam 12 is displaced which, in turn, causes each arm 24 to displace laterally in the direction of +A and −A, as described above. Each arm 24 forms a loop 29 with stationary traces 26 and 34 in the presence of a magnetic field 39. Accordingly, arm 24 displacement causes a change in loop area which induces an electrical output, as described above. As illustrated in FIG. 3, the area of each loop 29 will undergo the same change in area and so the EMF produced in each loop will be the same. Alternatively, each arm 24 could be connected at its transverse outer ends 37 and 43 to a stationary electrical trace via sections 28, as illustrated and described above with reference to FIGS. 1 and 2. It should further be appreciated that the number of movable members 24 can be varied depending on the desired electrical output.

Electrical sections 28 connected to transverse outer ends 37 and 43 of longitudinally outermost arm 24 are supported by substrate 14 via insulating pylons 36 as described above. Pylons 36 provide support for stationary traces 26 and 34, and further support all arms 24, which are suspended over substrate 14. Beam 12 also provides support for arms 24.

Figure 9:
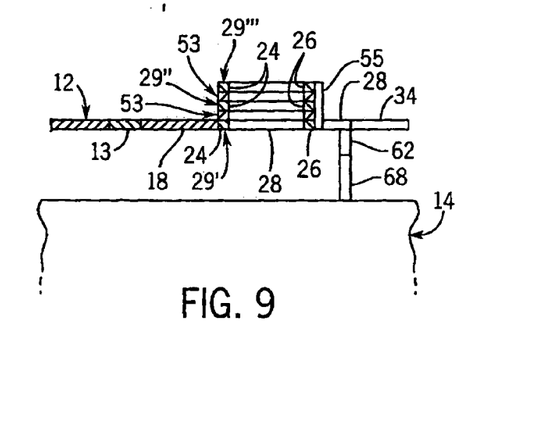
FIG. 9 is a sectional side elevation view of a MEMS device incorporating a plurality of loops connected in parallel in accordance with an alternate embodiment of the invention.

Referring now to FIG. 9, an alternate embodiment is illustrated, whereby a plurality of loops 29 are stacked vertically on top of each other, and electrically separated by loops 53 of an insulating material, for example $SiO_2$, that are interposed between adjacent loops 29. In particular, each loop 29 includes a movable arm 24 that is connected to a stationary trace 26 via electrical sections 28 as described above with reference to FIG. 1. Insulating material is disposed between adjacent arms 24, traces 26 and sections 28, thereby electrically isolating adjacent loops 29. Arm 24 of the lowermost loop 29' is directly connected to longitudinal end 18 of beam 12. Arms 24 of the upper loops 29'' and 29''' are in mechanical communication with (and preferably mechanically connected to) arm 24 of loop 29', and deflect in response to beam movement as described above. Accordingly, all arms 24 will deflect in response to beam movement, thereby changing the area of all loops 29 in the presence of magnetic field 39.

An electrical trace 55 connects the stationary traces 26 of adjacent loops 29. Trace 55 is further connected to sections 28 that connect to load 32 via traces 34 in the manner described above. Accordingly, each loop 29 is connected to the load in parallel while conserving space as compared to the embodiment illustrated in FIG. 3. Vertically stacked loops 29 and 53 are furthermore easier to fabricate using a selective etching process with respect to the embodiment illustrated in FIG. 2. It should be appreciated that any number of loops 29 can be included (and separated by an insulating layer) until generator 22 produces the desired electrical output in response to beam deflection.

With reference again to FIGS. 1-3, it should be appreciated that a source generator 20 can include a plurality of displacement causing members connected together that collectively act against left end 16 of beam. Accordingly, both generators 20 and 22 can include any and all power generator technologies described herein in any combination. It may further be desirable to encapsulate MEMS power converter 10 in a cap of the type described in U.S. patent application Ser. No. 09/842,975, the disclosure of which is hereby incorporated by reference as if set forth in its entirety herein. The cap can define an enclosure that houses a dielectric fluid that would permit the device 10 to operate at higher voltages while minimizing the likelihood of an arc being created across adjacent MEMS components. The cap can alternatively define an enclosure for a vacuum that would limit losses of the device 10 due to air resistance. The cap can also enclose any gas, such as argon, nitrogen, or other, and at any pressure, above or below atmospheric pressure, to control the mechanical damping of MEMS structure.

The present invention further recognizes that displacement of beam 12 will be maximized when the power transfer structure 21 is caused to oscillate at its resonant frequency. Beam oscillation at the resonance frequency can be achieved in one of several ways. First, the displacement caused by the source generator 20 can be adjusted to oscillate beam 12 at the resonance frequency. However, given that the electrical power supplied to source 20 is typically standard and not easily adjustable, the mass of the beam 12 and/or arm 24 can be increased or decreased during fabrication to cause the beam 12 to oscillate at the resonant frequency given a known source generator output. Alternatively, if the electrical power supplied to source generator 20 has adjustable frequency, the frequency can be set to a value that causes beam 12 to oscillate at the resonant frequency.

Figure 12:
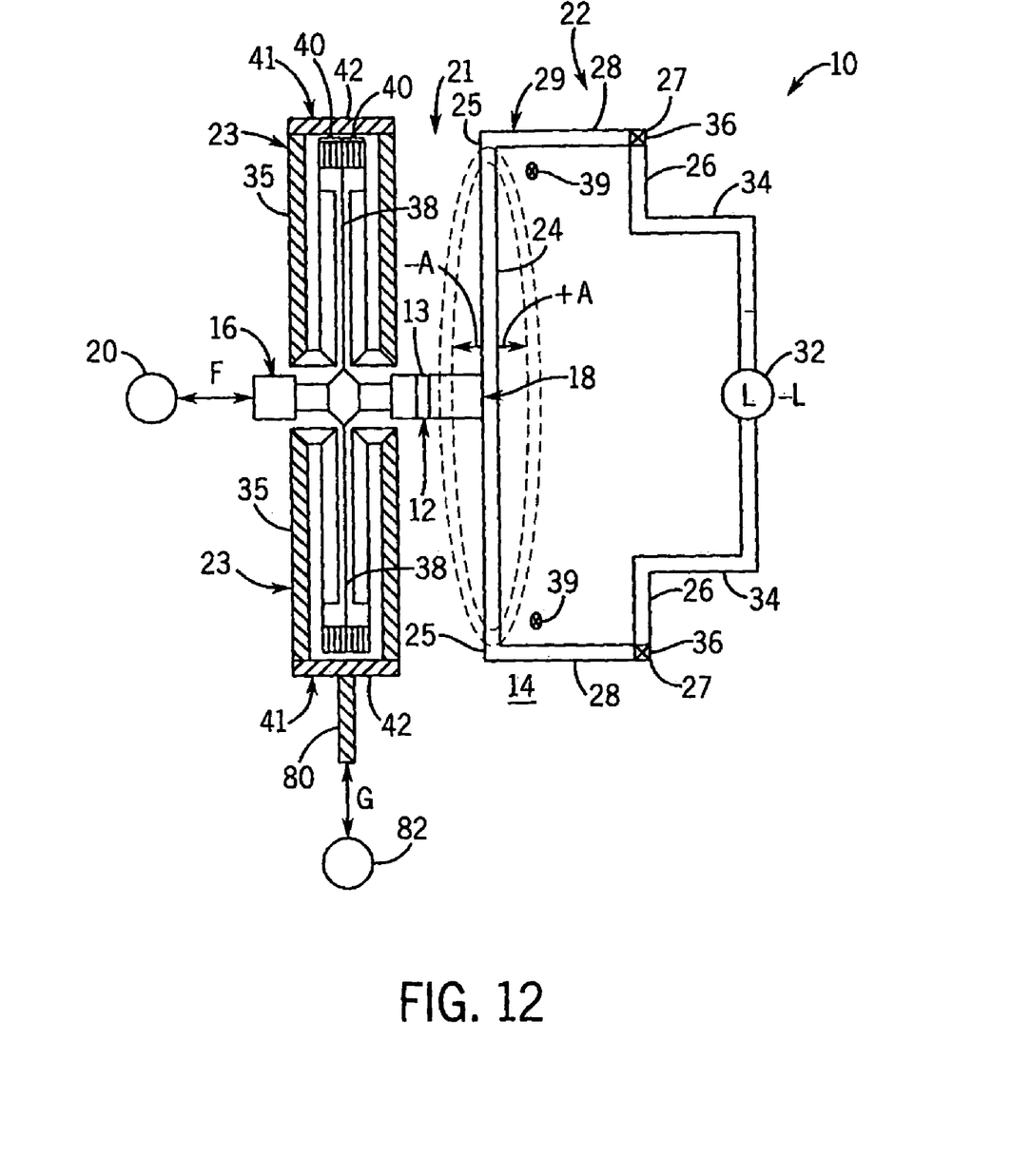
FIG. 12 is a simplified top plan view of a MEMS device constructed in accordance with an alternate embodiment that includes an actuator enabling real-time adjustment to oscillate the movable beam at resonant frequency.

The present invention further contemplates that, even in circumstances where the electrical input to source generator 20 is fixed, thermal and other changes during operation can effect the frequency of beam oscillation. Accordingly, it may be desirable to adjust the resonant frequency of power transfer structure 21 in real time during operation of the device. Referring in particular to FIG. 12, one method of accomplishing the real-time adjustment of the resonant frequency includes connecting one of the pylons 42 to a movable arm 80. Accordingly, pylon 42 is no longer connected to substrate 14 as illustrated in FIG. 8, but rather is supported by arm 80. Arm 80 is, in turn, connected to the output end of an actuator 82. Actuator 82 is connected to substrate 14. Actuator 82 can comprise any actuators of the type described herein including a Lorentz force actuator and an electrostatic actuator. Accordingly, during operation, a voltage or current is supplied to actuator 82, which causes arm 80 to extend or retract transversely against beam 12 as indicated by Arrow G. Accordingly, the position or arm 80 can be adjusted by adjusting the electrical input to actuator 82, thereby changing the oscillation of beam 12 during operation. Advantageously, arm 80 can be set at a position that causes beam 12 to oscillate at its resonant frequency.

Referring now to FIGS. 4-7, source generator 20 of MEMS device 12 is illustrated in accordance with various embodiments of the present invention, it being appreciated that the generators illustrated and described herein are not exhaustive, and that any source capable of generating a force to displace beam 12 in the longitudinal direction is contemplated by the present invention. Furthermore, it should be appreciated that the sources illustrated are compatible with MEMS devices 10 having one loop or multiple loops or multiple loop portions 29, and may be implemented in one or more MEMS devices 10 whose output electrical traces 34 are connected together.

Figure 4:
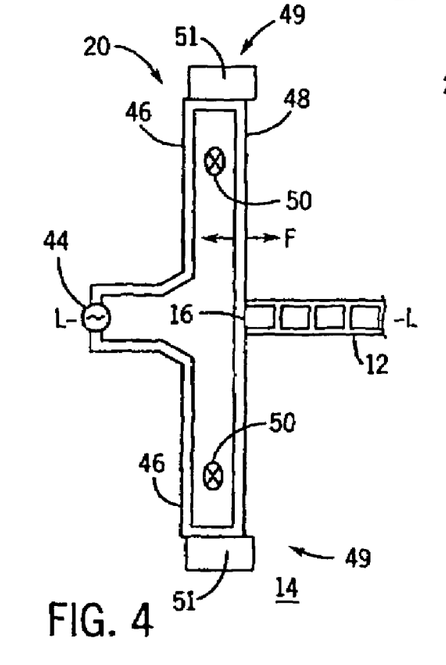
FIG. 4 is a simplified top plan view of a force/displacement generator of the MEMS device illustrated in FIG. 1 constructed in accordance with a preferred embodiment of the present invention.

Referring to FIG. 4 in particular, source generator 20 of one embodiment of the present invention relies on Lorentz forces to convert an input electrical current to a force and thus to translate beam 12 in the longitudinal direction under the generated forces F. In particular, a traditional ac current source 44 is connected via electrical traces 46 to a conductive transverse arm 48 that is suspended over the substrate 14 and is coplanar with beam 12. Ac current source 44 may also be suspended above the substrate 14, or could alternatively be mounted to the substrate 14. An electrical circuit is thereby formed from source 44, traces 46, and transverse arm 48. Transverse arm 48 defines transverse outer ends 49 that are connected to substrate 14 via insulating pylons 51 that extend upwardly from the substrate. Arm 48 extends perpendicular with respect to beam 12, and is connected to the leftmost longitudinal end 16 of beam 12. Transverse arm 48 is fabricated so as to be flexible with respect to bowing in the longitudinal direction, and is disposed in a magnetic field 50.

During operation, ac source 44 outputs electrical current through traces 46 and transverse arm 48 which, in combination with magnetic field 50, generates a Lorentz force F according to the right hand rule. The force F acts upon arm 48 and deflects the arm longitudinally forwards and backwards, depending on whether the output from source 44 is positive or negative. Because beam 12 is connected to arm 48, the deflection of arm 48 translates beam 12 along the longitudinal axis L-L. Beam 12 is preferably connected to the middle portion of arm 48, which experiences the greatest amount of deflection during use. The longitudinal movement of beam 12 drives electrical generator 22 to produce power that is delivered to load 32, as described above. Because section 13 of beam 12 preferably comprises an insulating material, current flowing through transverse arm 48 is advantageously unable to conduct to the electrical generator 22, thereby protecting the load 32 from power surges and the like.

While an ac source 44 is preferable to ensure that the beam 12 is constantly in motion, and the area of loop 29 is thereby constantly in flux, source 44 could also comprise a dc power source in accordance with the present invention. When electrical source 44 comprises a dc source, however, it will be desirable to include a switch in the circuitry of source generator 20 to deliver pulses of electricity from 0V to the dc level that is applied to transverse arm 48. When the electrical pulse is high, transverse arm 48 will deflect longitudinally outwardly. When the pulse is at zero, arm 48 will revert to its original undeflected position, thereby translating the beam 12 back and forth in the longitudinal direction and constantly generating electrical power in generator 22.

Alternatively still, source generator 20 could provide a power source 44 that does not draw from an electrical source, but rather whose power is provided by mechanical or thermal sources that respond to movement of the device 10 or fluctuations in temperature. For instance, the source 44 alternatively may comprise a piezoelectric crystal rather than an electrical source 44 that delivers current to transverse arm 48, thereby causing deflection of arm 48, upon deflection of the crystal due, for example, to vibration of the MEMS device 10 or underlying substrate 14. Alternatively, source 44 could comprise a thermocouple that produces a voltage in response to fluctuations in temperature. The electrical output from the thermocouple or piezoelectric crystal would travel through electrical traces 46 and arm 48 in the presence of magnetic field 50 to generate force F, as described above. In addition, deflection due to the various thermal expansion coefficients of different materials such as provided by a suitably constructed bi-morph, as is well known in the art, could be utilized to provide the beam displacement. An applied ac field can be used to generate heat such as due to electrical resistance to alternatively head and cool the bi-metallic strip.

Figure 5:
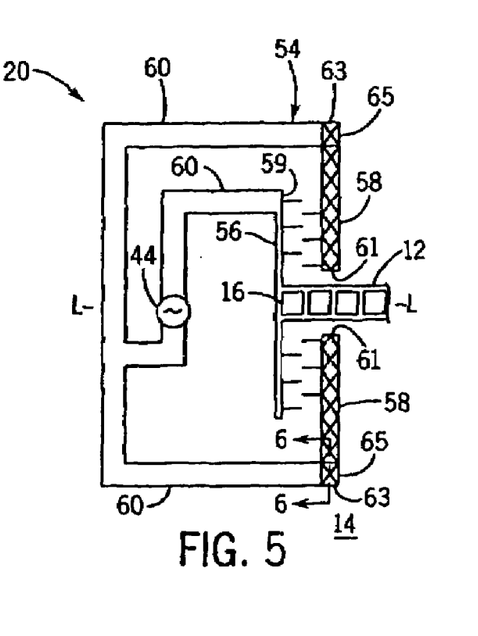
FIG. 5 is a simplified top plan view of a force/displacement generator of the MEMS device illustrated in FIG. 1 constructed in accordance with an alternate embodiment of the invention.

Referring now to FIG. 5, source generator 20 comprises an electrostatic actuator in accordance with an alternate embodiment of the invention. In particular, source generator 20 includes a power source 44, which preferably provides an ac voltage, but could alternatively comprise a dc source as described above. Alternatively, source 44 could comprise a piezoelectric material or a thermocouple, as described above, to generate a deflection in beam 12. Source generator 20 further includes a capacitor 54 having a first transverse capacitor plate 56 that is suspended above substrate 14 and coplanar with beam 12. Plate 56 further extends perpendicular to beam 12 and is connected to the leftmost longitudinal end 16 of beam at the midsection of the plate 56. Plate 56 is connected at one of its transverse outer ends 59 to power source 44 via an electrical trace 60. The outer ends 59 of plate 56 can further be connected to wrist structures 40, described above, that support plate 56 above substrate 14 while permitting longitudinal movement of plate 56. It should be appreciated that electrical trace 60 is fabricated so as to be flexible to also enable longitudinal movement of plate 56 during operation.

A pair of second transverse capacitor plates 58 extends parallel to plate 56 at a location longitudinally outwardly from first capacitor plate 56. Plates 58 define inner transverse ends 61 and outer transverse ends 63. Inner transverse ends 61 terminate at a location adjacent the longitudinally extending edge of beam 12, but do not contact the beam 12. Outer transverse ends 63 are disposed laterally outwardly from the transverse outer ends 59 of plate 58. Capacitor plate 56 and plates 58 are thus offset in the longitudinal direction such that their corresponding fingers are interdigitated, as understood by one having ordinary skill in the art. Outer transverse ends 63 are connected to source 20 via electrical traces 60, and are further connected to the substrate 14 via insulating pylons 65 that extend the entire length of plate 58 to prevent the plate from moving relative to the substrate 14, as illustrated in FIG. 6.

Referring now also FIG. 6, pylons 65 are constructed so as to electrically isolate the substrate 14 with respect to plates 58 and electrical traces 60, but to enable electrical communication between the plates 58 and electrical traces 60. In particular, a layer 68 of a wafer material, such as silicon, extends outwardly from substrate 14 and is connected at its outer end to a layer 62 of insulating material, such as $SiO_2$ or $Si_3N_4$. A layer 64 of electrically conductive material is connected to the outer end of the insulator 62, and provides a connection between the capacitor plate 58 and electrical trace 60. The insulating layer 62 ensures that any electricity traveling from ac source 44 to plate 58 does not conduct into the substrate 14. Plates 58 are thus rigidly connected to the substrate 14 in an electrically isolated manner. Furthermore, beam 12 is insulated between the source 20 and generator 22, as described above and, accordingly, source generator 20 is advantageously electrically isolated from the source 20.

During operation, a voltage is applied to plates 56 and 58 to produce an electrostatic charge that draws the interdigitated fingers (and therefore the plates) closer together. Movable plate 56 is thus drawn towards plate 58 when voltage is applied and subsequently relaxes back when the applied voltage is decreased or removed, which correspondingly translates beam 12 back and forth in the longitudinal direction. The longitudinal beam movement enables electrical generator 22 to output power to load 32 in the manner described above.

Referring now to FIG. 7, the present invention recognizes that source generator 20 may comprise a mass 67 that is attached to the leftmost longitudinal end 16 of beam 12 and suspended above the substrate 14. Mass 67 may comprise a conductive or insulating material, and preferably comprises a material that is sufficiently dense in order to minimize its size without reducing its functionality. In accordance with the preferred embodiment, mass 67 comprises Si, though it should be appreciated that $SiO_2$ may also be used. During operation, vibration of the MEMS device 10 (or underlying substrate 14) causes mass 67 to vibrate which, in turn, produces a force F that acts on beam 12 to translate the beam back and forth along the longitudinal axis L-L. Mass 67 thus preferably has a weight sufficient to produce a force F in response to vibration, wherein the force F overcomes the initial resistance of the beam 12 and movable transverse arm(s) 24 in the electrical generator 22 to bias beam 12 in the longitudinal direction. In this regard, it should be appreciated that mass 17 could be disposed anywhere on beam 12 that enables longitudinal movement of the beam 12 or uniformly along the length of the beam.

The invention has been described in connection with what are presently considered to be the most practical and preferred embodiments. However, the present invention has been presented by way of illustration and is not intended to be limited to the disclosed embodiments. In order to apprise the public of the scope of the present invention, the following claims are provided.

We claim:

1. An electrically isolated power transfer MEMS device for delivering electric power to a load, the device comprising:
   a source generator including a movable member, wherein the source generator converts an electrical input signal to a displacement of the movable member;
   a beam having an input end in communication with the movable member that receives the displacement, and an output end opposite the input end that communicates the displacement, wherein at least a portion of the beam between the input and output ends is insulating to prevent electrical conduction between the input end and the output end;
   an electrical generator disposed at the output end of the beam receiving the displacement from the output end of the beam and, in response to the displacement, generating electrical power that is delivered to the load;
   wherein the electrical generator comprises an electrical loop formed of at least one of:
   a plurality of movable arms connected to the beam and electrically connected in series and;
   a plurality of movable arms connected to the beam and electrically connected in parallel;
   wherein movement of the beam deflects the plurality of arms in the presence of a magnetic field to generate power for the load.

2. The device as recited in claim 1, wherein the source generator comprises a Lorentz actuator including a movable arm in mechanical communication with the beam, wherein electrical current is supplied to the arm in the presence of a magnetic field to generate a force that displaces the movable member.

3. The device as recited in claim 2, wherein the Lorentz actuator receives the electrical power from a source that is selected from the group consisting of an ac source and a dc source.

4. The device as recited in claim 3, wherein the source is provided by the dc power source, wherein the generator further comprises a switch in electrical communication with the source to deliver pulses of electricity to the movable arm.

5. The device as recited in claim 1, wherein the source generator comprises an electrostatic generator having a set of capacitor plates including at least one movable plate that is in mechanical communication with the power transfer structure.

6. The device as recited in claim 5, wherein the capacitor plates receive electrical power from a source that is selected from the group consisting of: an ac source and a dc source.

7. The device as recited in claim 6, wherein the electrostatic generator draws power from the dc power source, and wherein the electrostatic generator further comprises a switch in electrical communication with the source to deliver pulses of electricity to the capacitor plates.

8. The device as recited in claim 5, wherein the electrostatic generator receives a voltage input from a piezoelectric actuator.

9. The device as recited in claim 5, wherein the electrostatic actuator receives a voltage input from a thermocouple.

10. The device as recited in claim 1, wherein the power transfer structure includes a lever having a first end pivotally attached to a substrate, and a second end opposite the first end, wherein the input end is disposed proximal the first end, and wherein the output end is disposed proximal the second end.

11. The device as recited in claim 1, further comprising a plurality of source generators connected to a common electrical input.

12. The device as recited in claim 1, wherein the power transfer structure oscillates during operation, further comprising compensation elements to maintain the oscillation of the power transfer structure at a resonant frequency.

13. The device as recited in claim 1, wherein the source generator further comprises a bi-morph.

* * * * *